United States Patent
Kardes et al.

(10) Patent No.: US 10,572,817 B2
(45) Date of Patent: Feb. 25, 2020

(54) GRAPH-BASED ORGANIZATION ENTITY RESOLUTION

(71) Applicant: Intelius Inc., Bellevue, WA (US)

(72) Inventors: Hakan Kardes, Bellevue, WA (US); Deepak Konidena, Bellevue, WA (US); Siddharth Agrawal, Bellevue, WA (US); Micah Huff, Bellevue, WA (US); Ang Sun, Bellevue, WA (US); Lin Chen, Bellevue, WA (US); Andrew Kellberg, Bellevue, WA (US); Xin Wang, Bellevue, WA (US)

(73) Assignee: PEOPLECONNECT, INC., Seattle, WA (US)

(*) Notice: Subject to any disclaimer, the term of this patent is extended or adjusted under 35 U.S.C. 154(b) by 1218 days.

(21) Appl. No.: 14/663,174

(22) Filed: Mar. 19, 2015

(65) Prior Publication Data
US 2015/0269494 A1 Sep. 24, 2015

Related U.S. Application Data

(60) Provisional application No. 61/955,352, filed on Mar. 19, 2014, provisional application No. 62/010,276, filed on Jun. 10, 2014.

(51) Int. Cl.
*G06N 20/00* (2019.01)
*G06F 16/28* (2019.01)
*G06F 16/35* (2019.01)

(52) U.S. Cl.
CPC ........... *G06N 20/00* (2019.01); *G06F 16/285* (2019.01); *G06F 16/355* (2019.01)

(58) Field of Classification Search
None
See application file for complete search history.

(56) References Cited

U.S. PATENT DOCUMENTS

| | | |
|---|---|---|
| 2012/0278260 A1 | 11/2012 | Sauter et al. |
| 2013/0246315 A1* | 9/2013 | Joshi ................ G06N 5/04 706/10 |
| 2014/0215477 A1 | 7/2014 | Chen et al. |
| 2014/0330795 A1 | 11/2014 | Chavda et al. |
| 2015/0269230 A1 | 9/2015 | Kardes et al. |

OTHER PUBLICATIONS

Kirsten, Toralf, et al. "Data partitioning for parallel entity matching." arXiv preprint arXiv:1006.5309 (2010).*
Kolb, Lars, Andreas Thor, and Erhard Rahm. "Dedoop: Efficient deduplication with hadoop." Proceedings of the VLDB Endowment 5.12 (2012): 1878-1881.*
Bhattacharya, Indrajit, and Lise Getoor. "Entity resolution in graphs." Mining graph data (2006): 311.*
(Continued)

*Primary Examiner* — Daniel T Pellett
(74) *Attorney, Agent, or Firm* — Nixon & Vanderhye, P.C.

(57) ABSTRACT

A novel entity resolution approach for the organization entity domain can be implemented in the MapReduce framework with low memory requirements so that it may scale to large scale datasets. A new clustering approach, sClust, significantly improves the recall of the pairwise classifier.

13 Claims, 14 Drawing Sheets

(56) References Cited

OTHER PUBLICATIONS

Whang, Steven Euijong, et al. "Entity resolution with iterative blocking." Proceedings of the 2009 ACM SIGMOD International Conference on Management of data. ACM, 2009.*

Kolb, Lars, Andreas Thor, and Erhard Rahm. "Load balancing for mapreduce-based entity resolution." Data Engineering (ICDE), 2012 IEEE 28th International Conference on. IEEE, 2012.*

Kolb, Lars, and Erhard Rahm. "Parallel entity resolution with dedoop." Datenbank-Spektrum 13.1 (2013): 23-32.*

Cabanes, Guénaël, et al. "A new topological clustering algorithm for interval data." Pattern Recognition 46.11 (2013): 3030-3039.*

Ashok, Powar Gayatri, and D. M. Yadav. "A Clustering Based Hybrid Recommendation System for Services in Big Data."*

Office Action dated Jun. 1, 2017, issued in related U.S. Appl. No. 14/663,141.

Chen, Xiao, et al., "Cloud-Scale Entity Resolution: Current State and Open Challenges," Open Journal of Big Data (OJBD), vol. 4, Issue 1, 2018, pp. 30-51.

James, Alex, et al., "Entity Resolution using Cloud Computing," Proceedings of SPIE, vol. 9499, 2015, pp. 94990S-1-94990S-9.

Kimmett, Ben, et al., "Fuzzy Joins in MapReduce: Edit and Jaccard Distance," 2016 7th International Conference on Information, Intelligence, Systems & Applications (IISA), 2016, 7 pages.

Liu, Qiaoling, et al., "CompanyDepot: Employer Name Normalization in the Online Recruitment Industry," KDD '16, 2016, 10 pages.

Liu, Qiaoling, et al., "Supporting Employer Name Normalization at both Entity and Cluster Level," KDD '17, 2017, pp. 1883-1892.

Talburt, John R., et al., "Entity Information Life Cycle for Big Data: Master Data Management and Information Integration," Chapter 10—CSRUD for Big Data, 2015, ISBN: 978-0-12-800537-8, pp. 161-190.

Yartseva, Lyudmila, "Alignment and Assembly: Inferring Networks from Noisy Observations," Thesis No. 7562, 2017, 123 pages.

Notice of Allowance dated Aug. 23, 2018, issued in related U.S. Appl. No. 14/663,141.

Patel, Aditya B., et al., "Addressing Big Data Problem Using Hadoop and Map Reduce," 2012 Nirma University International Conference on Engineering, NUiCONE-2012, Dec. 2012, 5 pages.

G., Sujatha Das, et al., "Person-Name Parsing for Linking User Web Profiles," WebDB'15 Proceedings of the 18th International Workshop on Web and Databases, May 2015, pp. 20-26.

Kardes, Hakan, et al., "Structural Graph Indexing for Mining Complex Networks," International Conference on Distributed Computing Systems, 2010, pp. 99-104.

Kardes, Hakan, et al., "Six Degrees of Separation among US Researchers," Advances in Social Networks Analysis and Mining (ASONAM), Aug. 2012, pp. 654-659.

Kardes, Hakan, et al., "Graph-based Approaches for Organization Entity Resolution in MapReduce," Proceedings of the TextGraphs-8 Workshop, Oct. 18, 2013, pp. 70-78.

Kardes, Hakan, et al., "CCF: Fast and Scalable Connected Component Computation in MapReduce," 2014 International Conference on Computing, Networking and Communications, 2014, pp. 994-998.

Kardes, Hakan, et al., "Graph Based Induction of unresponsive routers in Internet topologies," Computer Networks 81, 2015, pp. 178-200.

McNeill, W. P., et al., "Dynamic Record Blocking: Efficient Linking of Massive Databases in MapReduce," Proceedings of the 10th International Workshop on Quality in Databases, 2012, pp. 99-104.

* cited by examiner

```
Blocking Iterations
map(key, value)
  if(key.equals(EntityName)
    String[] tokens ← value.split(" ")
    sublevelTokenSet ← ∅
    toplevelTokenSet ← ∅
    for each (token ∈ tokens)
      sublevelTokenSet.add(token.hashCode())
      if(notExist(blackList, token))
        toplevelTokenSet.add(token.hashCode())
    String newValue ← value
    for each (sToken ∈ sublevelTokenSet)
      newValue ← newValue.append(STR + sToken)
    for each (tToken ∈ toplevelTokenSet)
      emit(tToken, newValue)
  else
    String[] keyTokens ← key.split(STR)
    String[] valueTokens ← value.split(STR)
    for each (token ∈ valueTokens)
      if(token > keyTokens[keyTokens.length − 1])
        emit(key.append(STR + token), value)

reduce(key, < iterable > values)
    buffer ← ∅
  for each (value ∈ values)
    buffer.add(value)
    if(buffer.length ≥ MAXBLOCKSIZE)
      break
  if(buffer.length ≥ MAXBLOCKSIZE)
    for each (ele ∈ buffer)
      emit(key, ele)
    for each (value ∈ values)
      emit(key, value)
  elseif(buffer.length ≥ 1)
    blocks.append(key, buffer)
```

Figure 4B

```
Transitive Closure Iterate
map(key, value)
  emit(key, value)
  emit(value, key)

reduce(key, < iterable > values)
  minValue ← values.next()
  if(minValue < key)
    emit(key, minValue)
    for each (value ∈ values)
      Counter.NewPair.increment(1)
      emit(value, minValue)
```
(a) Transitive Closure - Iterate

```
Transitive Closure Dedup
map(key, value)
  emit(key.append(STR + value), null)

reduce(key, < iterable > values)
  String[] keyTokens ← key.split(STR)
  emit(keyTokens[0], keyTokens[1])
```
(b) Transitive Closure - Dedup

Figure 7

Bring together all edges for each partition
*Phase-1*
*map*(key, value)
  if(*key.equals*(*ConflationOutput*))
    if ((*value.score* $\leq NO\_MATCH\_THR$)||
    (*value.score* $\geq MATCH\_THR$))
      *emit*(*value.entity1, value*)
  else      //*TCDedupOutput*
    *temp.entity1* ← *value*
    *temp.entity2* ← *null*
    *temp.score* ← *null*
    *emit*(*key, temp*)
    *emit*(*value, temp*)
*reduce*(key, < iterable > values)
  valueList ← ∅
  for each (*value* ∈ *values*)
    if(*value.entity2* = *null*)
      *clusID* ← *value.entity1*
    else
      valueList.*add*(*value*)
  for each (*value* ∈ *valueList*)
    *emit*(*clusID, value*)

*Phase-2*
*map*(key, value)
  *emit*(*key, value*)
*reduce*(key, < iterable > values)
  valueList ← ∅
  for each (*value* ∈ *values*)
    valueList.*add*(*value*)
  *emit*(*key, valueList*)

Figure 8

```
Clustering
map(key, valueList)
  for each (value ∈ valueList)
    if(value.score ≥ MATCH_THR)
      nodes.insert(value.entity1)
      nodes.insert(value.entity2)
    else
      node1Index ← find(value.entity1, nodes)
      node2Index ← find(value.entity2, nodes)
      nodes[node1Index].conflictSet.insert(node2Index)
      nodes[node2Index].conflictSet.insert(node1Index)
  for each (value ∈ valueList)
    if(value.score ≥ MATCH_THR)
      node1Index ← find(value.entity1, nodes)
      node2Index ← find(value.entity2, nodes)
      node1ClusIDLength ← nodes[node1Index].clusIDs.length
      node2ClusIDLength ← nodes[node2Index].clusIDs.length
      if((node1ClusIDLength == 0) && (node2ClusIDLength == 0))
        clusters[numClusters].nodes[0] ← node1Index
        clusters[numClusters].nodes[1] ← node2Index
        clusters[numClusters].confSet ←
          mergeSortedLists(nodes[node1Index].confSet, nodes[node2Index].confSet)
        nodes[node1Index].clusIDs.insert(numClusters)
        nodes[node2Index].clusIDs.insert(numClusters)
        numClusters++
      elseif(node1ClusIDLength == 0)
        for each (node2ClusID ∈ nodes[node2Index].clusIDs)
          if(notContain(clusters[node2ClusID].confSet, node1Index))
            insertToSortedList(clusters[node2ClusID].nodes, node1Index)
            clusters[node2ClusID].confSet ←
              mergeSortedLists(clusters[node2ClusID].confSet, nodes[node1Index].confSet)
            nodes[node1Index].clusIDs.insert(node2ClusID)
      elseif(node2ClusIDLength == 0)
        for each (node1ClusID ∈ nodes[node1Index].clusIDs)
          if(notContain(clusters[node1ClusID].confSet, node2Index))
            insertToSortedList(clusters[node1ClusID].nodes, node2Index)
            clusters[node1ClusID].confSet ←
              mergeSortedLists(clusters[node1ClusID].confSet, nodes[node2Index].confSet)
            nodes[node2Index].clusIDs.insert(node1ClusID)
      elseif(notIntersect(clusters[node1ClusID].clusIDs, clusters[node2ClusID].clusIDs))
        for each (node1ClusID ∈ nodes[node1Index].clusIDs)
          for each (node2ClusID ∈ nodes[node2Index].clusIDs)
            if( notIntersect(clusters[node1ClusID].confSet, clusters[node2ClusID].nodes) &&
                notIntersect(clusters[node2ClusID].confSet, clusters[node1ClusID].nodes) )
              clusters[node1ClusID].nodes ←
                mergeSortedList(clusters[node1ClusID].nodes, clusters[node2ClusID].nodes)
              clusters[node1ClusID].confSet ←
                mergeSortedLists(clusters[node1ClusID].confSet, clusters[node2ClusID].confSet)
              for each (nodeIndex ∈ clusters[node2ClusID].nodes)
                nodes[nodeIndex].clusIDs.insert(node1ClusID)
              clusters[node2ClusID].isRemoved ← true
              clusters[node2ClusID].nodes ← null
              clusters[node2ClusID].confSet ← null
```

Figure 9B

GRAPH-BASED ORGANIZATION ENTITY RESOLUTION

CROSS-REFERENCE TO RELATED APPLICATIONS

This application claims the benefit of U.S. Provisional Application Nos. 61/955,352 filed Mar. 19, 2014, and 62/010,276 filed Jun. 10, 2014, both incorporated herein by reference.

STATEMENT REGARDING FEDERALLY SPONSORED RESEARCH OR DEVELOPMENT

None.

FIELD

The technology herein relates to a machine learning pipeline providing blocking and clustering strategies and techniques that can be used to deploy a massive database of organization entities.

BACKGROUND

Entity Resolution is the task of identifying which records in a database refer to the same entity. A challenge for builders of databases whose information is culled from multiple sources is the detection of duplicates, where a single real-world entity gives rise to multiple records. Online citation indexes need to be able to navigate through the different capitalization and abbreviation conventions that appear in bibliographic entries. Government agencies need to know whether a record for "Robert Smith" living on "Northwest First Street" refers to the same person as one for a "Bob Smith" living on "1st St. NW".

BRIEF DESCRIPTION OF THE DRAWINGS

The following detailed description of exemplary non-limiting illustrative embodiments is to be read in conjunction with the drawings of which:

FIG. 4B shows an example iterative blocking pseudo code;

FIG. 7 shows an example transitive closure pseudo code;

FIG. 8 shows an example clustering pre-processing pseudo code;

FIG. 9B shows an example agglomerative clustering pseudo code;

DETAILED DESCRIPTION OF EXAMPLE NON-LIMITING IMPLEMENTATIONS

The example embodiment provides graph-related blocking and clustering operations and a pairwise linkage model. Novel, highly scalable components implement an entity resolution pipeline which in one non-limiting embodiment is customized for organizations.

Figure 1:
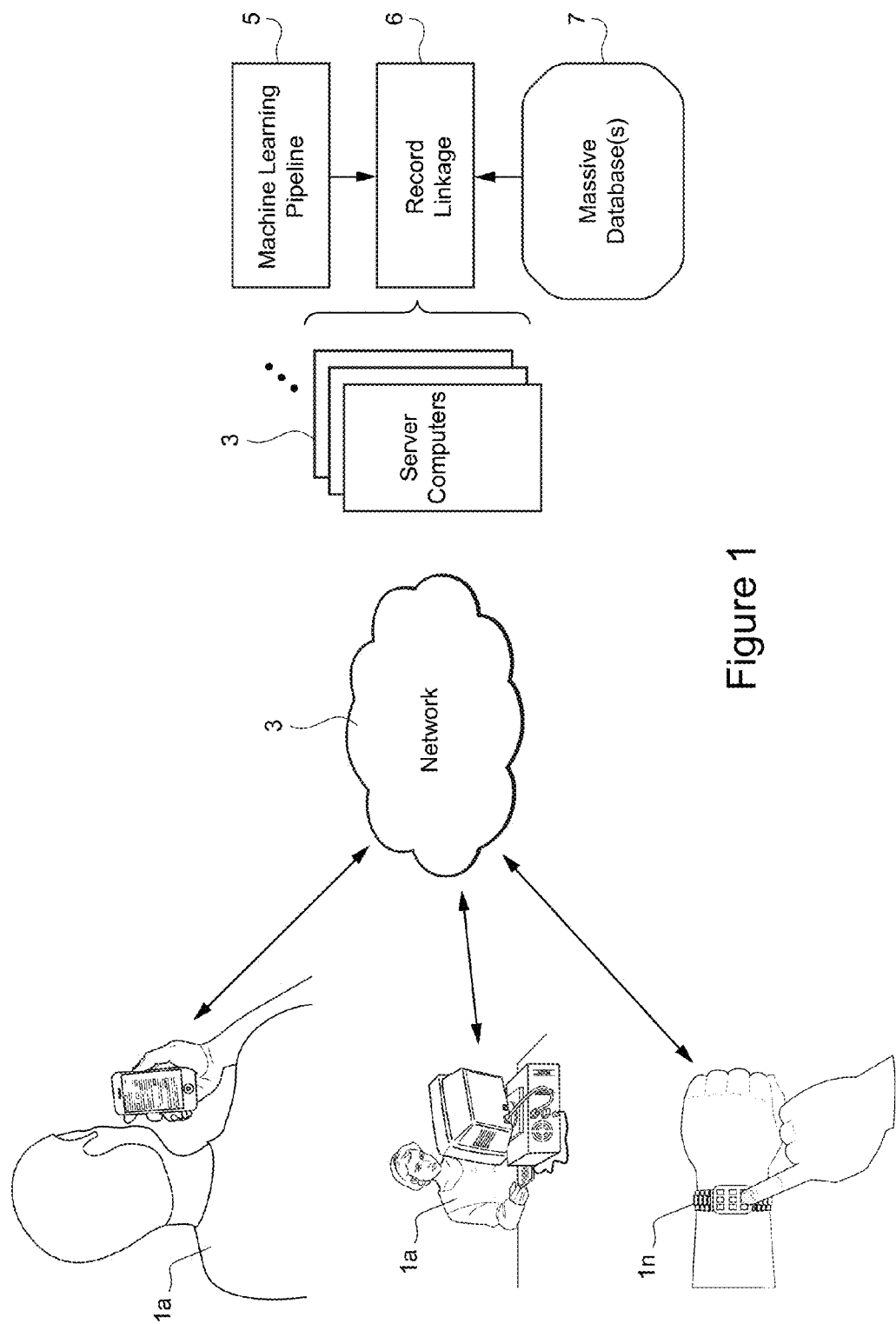
FIG. 1 shows an example non-limiting data search, analysis and retrieval system.

FIG. 1 shows an example non-limiting data analysis and retrieval system including a machine learning pipeline 5. In the example shown, users $1a$, $1b$, . . . , $1n$ use network connected computer presentation devices (e.g., smart phones, personal computers, wearable computers, etc.) to access servers 4 via a network(s) 3. Such user devices can comprise any type (e.g., wired or wireless) of electronic device capable of accessing and presenting data via a display or otherwise. In the example shown, the devices that users $1a$, $1b$, . . . $1n$ operate may for example include resident applications, internet browsers or both that are capable of conveying searches and other queries inputted by the users to the server computers 4, and provide server responses back to the user devices for display or other presentation.

As one example, suppose a user $1a$ wants to determine current contact, employment and other information for Josie Hendricks who works for Microsoft. The user can input "Josie Hendricks" into search fields displayed by his device, audibly request his device to search for "Josie Hendricks", or otherwise input his search query. His user device may include one or more processors, memory devices, input devices, output devices and other conventional components that create an electronic search query and transmit the query electronically via network 3 to the server computers 4 using the http or other protocol. The server computers 4 in turn query a potentially massive database(s) 7 in real time to determine whether one or more records exists for "Josie Hendricks" and whether they are linked with any organizations. The server computers 4 (which may comprise conventional processors, memory devices, network adapters and other components) search the database to locate records that are relevant to the user's search query. If such records are found, the server computers 4 may respond by retrieving located information from database(s) 7 and transmitting the information to the user's device via network 3. Such transmitted information could inform the user that Josie works for Microsoft or a particular Microsoft entity.

But resolving the particular organization that Josie works for may not always be so easy.

Efficient Entity Resolution

One non-limiting embodiment provides a record linkage 6 with entity resolution for the organization entity domain where all or some of the information available are the organization names and their relations with individuals. It may be helpful to first describe the entity resolution for organization names, its significance and the challenges in more detail.

One example process starts by collecting billions of personal records from multiple sources (e.g., three sources of U.S. records) to power a major commercial People Search Engine operating on server computers 4. Example fields on these records might for example include name, address, birthday, phone number, (encrypted) social security number, relatives, friends, job title, universities attended, and organizations worked for. Since the data sources are heterogeneous, each data source provides different aliases of an organization including abbreviations, preferred names, legal names, etc. For example, Person A (Josie Hendricks) might have both "Microsoft", "Microsoft Corp", "Microsoft Corporation", and "Microsoft Research" in his/her profile's organization field. Person B might have "University of Washington", while Person C has "UW" as the organization listed in his/her profile. Moreover, some organizations change their names, or are acquired by other institutions and become subdivisions. There are also many organizations that share the same name or abbreviation. For instance, each of "University of Washington", "University of Wisconsin Madison", "University of Wyoming" share the same abbreviation, "UW". Additionally, some of the data sources might be noisier than the others and there might be different kind of typographical errors that need to be addressed.

Addressing the above issues in organization fields is helpful to data quality as graphical representations of the data become more popular. If we show different representations of the same organization as separate institutions in a single person's profile, it will decrease the confidence of users $1a$, $1b$, $1c$ about data quality. Moreover, it may be helpful to have a unique representation of organizations in order to properly answer more complicated graph-based queries such as "how am I connected to company X?", or "who are my friends that have a friend that works at organization X, and graduated from school Y?"

The FIG. 1 machine learning pipeline 5 can be used to solve these problems and provide more useful record linkage results, in particular where linkage to particular organization(s) is involved.

Example Machine Learning Pipeline 5

Figure 1A:
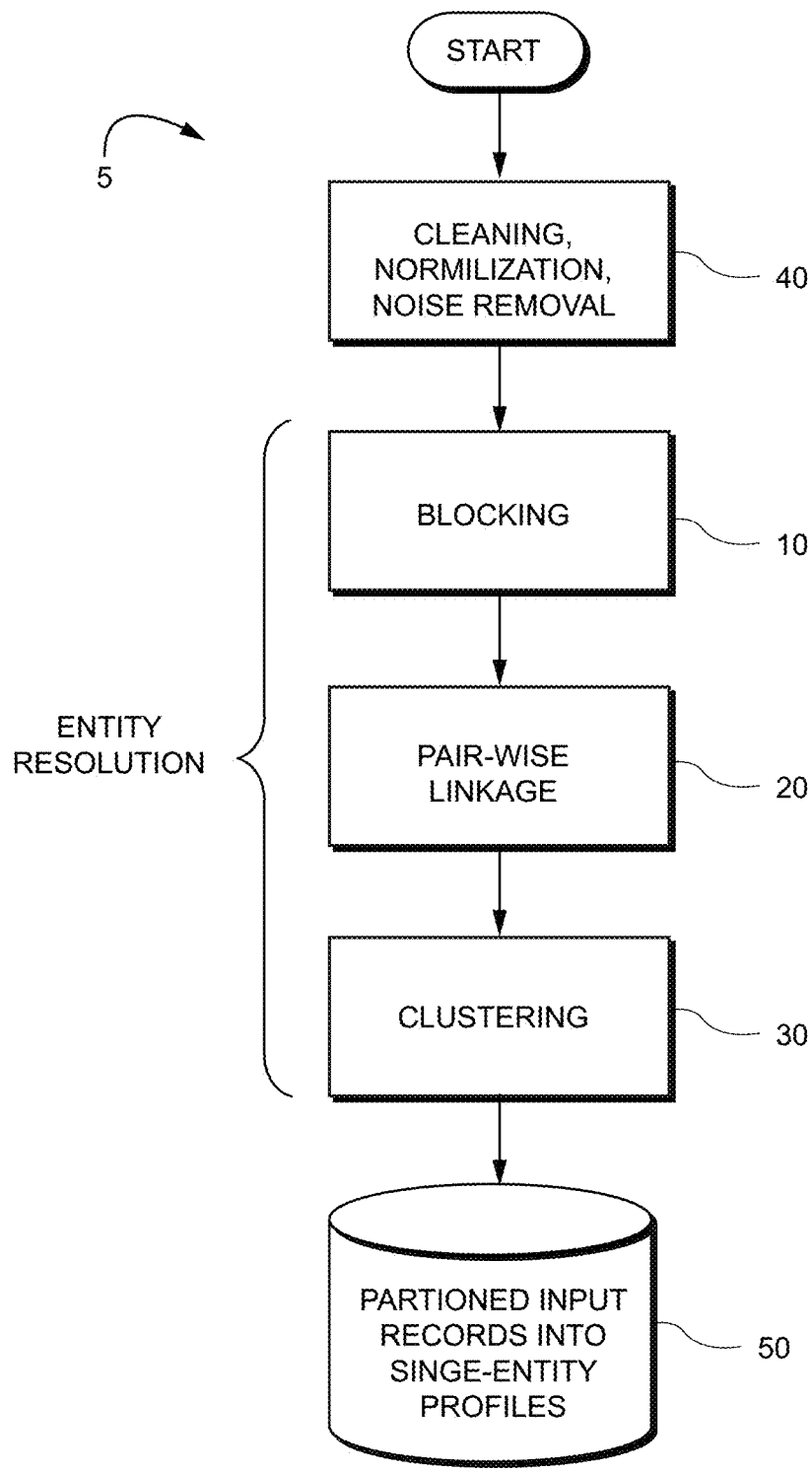
FIG. 1A is a block diagram of an example overall non-limiting machine learning pipeline for entity resolution using graph-based blocking and clustering components.

FIG. 1A shows an example machine learning pipeline 5 embodiment. In this particular example, as is conventional, all records first go through a cleaning process 40 that starts with the removal of bogus, junk and spam records. Then all records are normalized to an approximately common representation. Finally, all major noise types and inconsistencies are addressed, such as empty/bogus fields, field duplication, outlier values and encoding issues.

As FIG. 1A further shows, machine learning pipeline for the entity resolution problem consists of three major components: blocking 10, pairwise linkage 20, and clustering 30. Since comparing all pairs of records is quadratic in the number of records and hence is intractable for large data sets, the blocking 10 groups records by shared properties to determine which pairs of records should be examined by the pairwise linker 20 as potential duplicates. Next, pairwise linkage 20 assigns a probability score to pairs of records inside each block. If a pair scores above a user-defined threshold, the records are presumed to represent the same entity. Finally, clustering 30 turns the input records into clusters of records (or profiles), where each cluster is uniquely associated with a single real-world entity. The clustering 30 does this in the example non-limiting embodiment by partitioning the input records into sets of records called profiles 50, where each profile corresponds to a single entity.

Example Non-Limiting MapReduce Implementation

The processing of large data volumes benefits from highly scalable parallelized processs which distributed computing can provide. In more detail, in one example non-limiting implementation, the large volume of the data to be processed suggests distributing the FIG. 1A pipeline across a cluster of machines. In this example non-limiting implementation, it is possible to use the conventional MapReduce computing framework (see FIG. 2A) to provide such scaleability for machine learning pipeline 5. For example, both blocking 10 and clustering 30 of FIG. 1A may be implemented as a series of Hadoop or other MapReduce jobs written in Java. Generally speaking, MapReduce is a standard distributed computing framework that provides an abstraction that hides many system-level details from the programmer. This allows a developer to focus on what computations need to be performed, as opposed to how those computations are actually carried out or how to get the data to the processes that depend on them. MapReduce thus provides a means to distribute computation without burdening the programmer with details of distributed computing. See Lin et al., Data-Intensive Text Processing with MapReduce, Synthesis Lectures on Human Language Technologies ((Morgan and Claypool Publishers 2010), incorporated herein by reference. However, as explained below, alternative implementations are also possible and encompassed within the scope of this disclosure.

As is well known, MapReduce divides computing tasks into a map phase in which the input, which is given as (key,value) pairs, is split up among multiple machines to be worked on in parallel; and a reduce phase in which the output of the map phase is put back together for each key to independently process the values for each key in parallel. Such a MapReduce execution framework coordinates the map and reduce phases of processing over large amounts of data on large clusters of commodity machines. MapReduce thus codifies a generic "recipe" for processing large data sets that consists of those two stages.

Figure 2A:
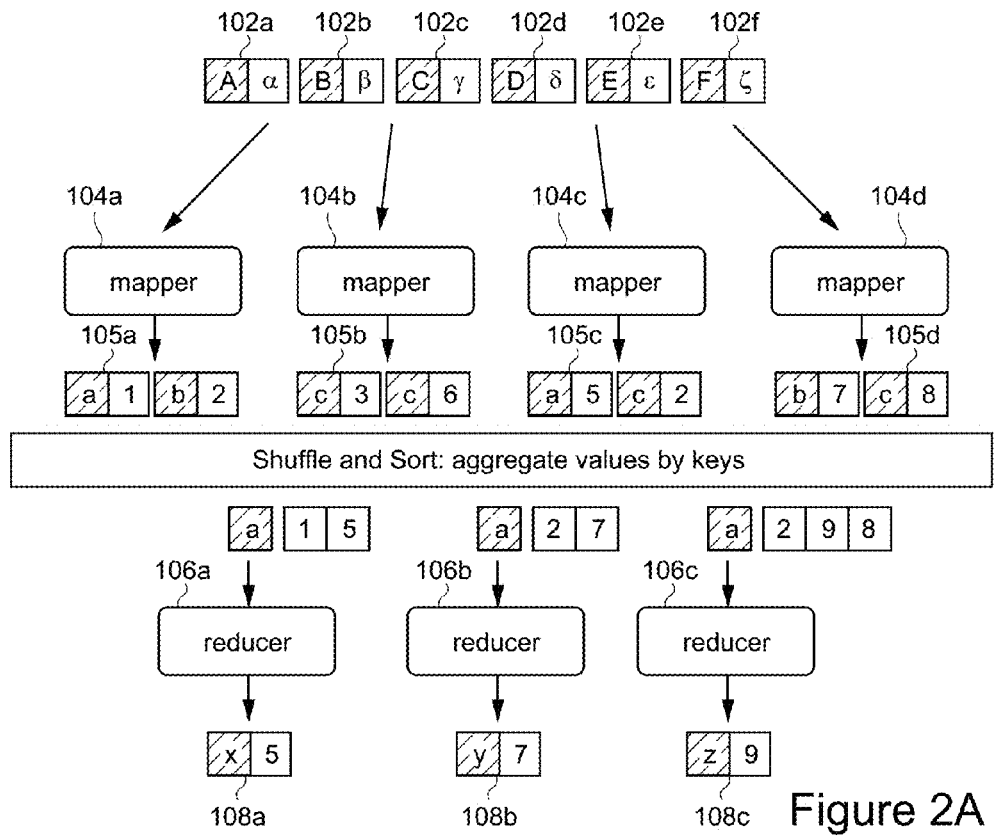
FIG. 2A shows an example MapReduce architecture.

Referring now more particularly to the FIG. 2A diagram of an example MapReduce implementation, in the first, or "mapping" stage 104, a user-specified computation is applied over all input records in a data set. These operations occur in parallel with intermediate output that is then aggregated by another user-specified reducer computation 106. The associated execution framework coordinates the actual processing.

Thus, as shown in FIG. 2A, MapReduce divides computing tasks into a map or mapper phase 104 in which the job is split up among multiple machines to be worked on in parallel, and a reducer phase 106 in which the outputs of the map phases 104 are put back together. The map phase 104 provides a concise way to represent the transformation of a data set, and the reduce phase 106 provides an aggregation operation. Moreover, in a MapReduce context, recursion becomes iteration.

In this FIG. 2A example, key data pairs 102 form the basic data structure. Keys and values may be primitives such as integers, floating point values, strings and raw bytes, or they may be arbitrarily complex structures (lists, tuples, associative arrays, etc.). Programmers may define their own custom data types, although a number of standard libraries are available to simplify this task. MapReduce processes involve imposing the key-value structure on arbitrary data sets. In MapReduce, the programmer defines a mapper and a reducer with the following signatures:

map:(k1,v1)→[(k2,v2)]
reduce:(k2,[v2])→[(k3,v3)]
where [ . . . ] denotes a list.

The input to processing starts as data stored in an underlying distributed file system. The mapper 104 is applied to every input key-value pair 102 (split across an arbitrary number of files) to generate an arbitrary number of intermediate key-value pairs. The reducer 106 is applied to all values associated with the same intermediate key to generate output key-value pairs 108. Output key-value pairs from each reducer 106 are written persistently back onto the distributed file system to provide r files where r is the number of reducers. Thus, mappers 104 are applied to all input key-value pairs 102, which generate an arbitrary number of intermediate key-value pairs 105. Reducers 106 are applied to all values associated with the same key. Between the map and reduce phases lies a barrier 110 that involves a large distributed sort and group by.

Example Non-Limiting Hadoop Cluster Architecture Distributed Computing Platform

MapReduce can be implemented using a variety of different distributed execution frameworks such as the open-source Hadoop implementation in Java, a proprietary implementation such as used by Google, a multi-core processor implementation, a GPGPU distributed implementation, the CELL architecture, and many others. High performance computing and conventional cluster architectures can provide storage as a distinct and separate component from computation. In a Hadoop implementation, reducers 106 are presented with a key and an iterator over all values associated with a particular key, where the values are arbitrarily ordered.

The MapReduce distributed file system is specifically adapted to large-data processing workloads by dividing user data into blocks and replicating those blocks across the local discs of nodes in the computing cluster. The distributed file system adopts a master-slave architecture in which the master maintains the file name space (metadata, directory structure, file to block mapping, location of blocks, and access permissions) and the slaves manage the actual data blocks. Such functionality includes name space management, coordinating file operations, maintaining overall health of the file system, and other functions. Hadoop is a mature and accessible implementation, and is therefore convenient for exposition here. Of course, nothing is this example non-limiting implementation is limited to MapReduce or Hadoop per se. Rather, any non-limiting detailed design using distributed computer environments or other parallel processing arrangements could be used.

Figure 2B:
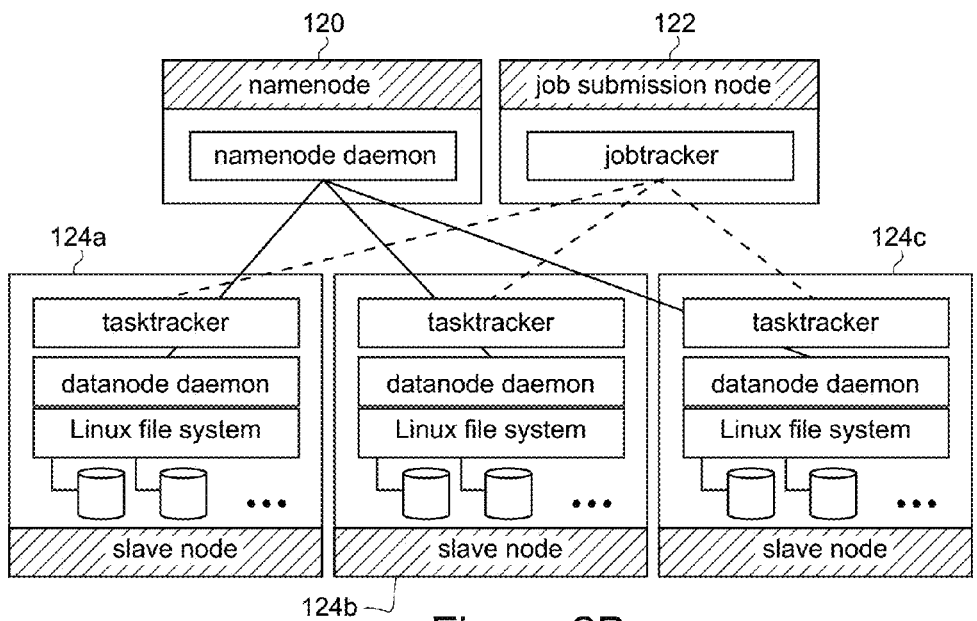
FIG. 2B shows an example Hadoop implementation.

FIG. 2B shows one example implementation Hadoop cluster architecture which consists of three separate components: name node 120, job submission node 122 and many slave nodes 124. Name node 120 runs a name node daemon. The job submission node 122 runs the job tracker, which is the single point of contact for a client wishing to execute a MapReduce job. Job tracker monitors the progress of running MapReduce jobs and is responsible for coordinating the execution of the mappers and reducers 104, 106.

The bulk of the Hadoop cluster consists of slave nodes 124 that run both a task tracker (responsible for actually running user code) and a data node daemon (for serving HDFS data). In this implementation, a Hadoop MapReduce job is divided up into a number of map tasks and reduce tasks. Task trackers periodically send heartbeat messages to the job tracker that also doubles as a vehicle for task allocation. If the task tracker is available to run tasks, the return acknowledgement of the task tracker heartbeat contains task allocation information. The number of reduce tasks is equal to the number of reducers 106. The number of map tasks, on the other hand, depends on many factors: the number of mappers specified by the programmer, the number of input files and the number of HDFS data blocks occupied by those files. Each map task 104 is assigned a sequence of input key value pairs 102 which are computed automatically. The execution framework aligns them to HDFS block boundaries so that each map task is associated with a single data block. The job tracker tries to take advantage of data locality—if possible, map tasks are scheduled on the slave node that codes the input split so that the mapper will be processing local data. If it is not possible to run a map task on local data, it becomes necessary to stream input key-value pairs across the network.

In the Hadoop implementation, mappers 104 are Java objects with a MAP method among others. A mapper object is instantiated for every map task by the task tracker. Life cycle of this object begins with instantiation where a hook is provided in the API to run programmer-specified code. This means that mappers can read inside data, providing an opportunity to load static, static data sources, dictionaries and the like. After initialization, the MAP method is called by the execution framework on all key-value pairs in the input split. Since these method calls occur in the context of the same Java object, it is possible to preserve state across multiple key-value pairs within the same map task. After all key-value pairs in the input split have been processed, the mapper object provides an opportunity to run programmer-specified termination code.

The execution of the reducers is similar to that of the mappers. Each reducer object is instantiated for every reduce task 106. The Hadoop API provides hooks for programmer-specified initialization and termination code. After initialization, for each intermediate key in the partition, the execution framework repeatedly calls the REDUCE method with an intermediate key and an iterator over all values associated with that key. The programming model guarantees that intermediate keys will be presented to the reduce method in sorted order. Since this occurs in the context of a single object, it is possible to preserve state across multiple intermediate keys in associated values within a single reduce task.

Example Non-Limiting Blocking 10

Making use of the MapReduce and Hadoop architectures described above, how might we subdivide a huge number of organizations based on similarity or probability scores when all we have is their names and their relation with people? We could start by using MapReduce to group them into sets according to the words they contain. This would go a long way towards putting together records that represent the same organization, but it would still be imperfect because organizations may have nicknames, abbreviations, previous names, or misspelled names. To enhance this grouping, we could consider a different kind of information like soundex or a similar phonetic process for indexing words to address some of the limitations of above grouping due to typos. We can also group together the organizations which appear in the same person's profile. This way, we will be able to block the different representations of the same organization to some extent. With a handful of keys like this we can build redundancy into our system to accommodate different types of error, omission, and natural variability. The blocks of records they produce may overlap, but this is desirable because it gives the clustering a chance to join records that blocking did not put together.

The above blocks will vary widely in size. For example, we may have a small set of records containing the word "Netflix" which can then be passed along immediately to the linkage component. However, we may have a set of millions of records containing the word "State" which still needs to be cut down to subsets with manageable sizes, otherwise it will be again impractical to do all pairwise computations in this block. One way to do this is to find other common properties to further subdivide this set. The set of all records containing not only "State" but also a specific state name like "Washington" is smaller than the set of all records containing the word "State", and intuitively records in this set will be more likely to represent the same organization. Additionally we could block together all the "State" records with the same number of words, or combination of the initials of each word. As with the original blocks, overlap between these sub-blocks is desirable. We do not have to be particularly artful in our choice of sub-blocking criteria: any property that seems like it might be individuating will do. As long as we have an efficient way to search the space, we can let the data dynamically choose different sub-blocking strategies for each oversize block.

Figure 3:
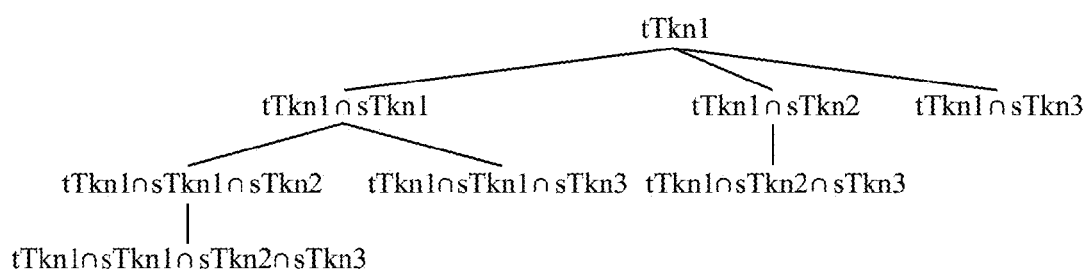
FIG. 3 shows the root node of a tree representing an oversized block for a given first name and other nodes representing possible sub-blocks (in the example embodiment, the sub-blocking process enumerates the tree breadth-first, stopping when it finds a correctly sized sub-block)

To this end, we use the ordering on block keys to define a binomial tree where each node contains a list of block keys and is the parent of nodes that have keys that come later in the ordering appended to the list. FIG. 3 shows an example tree for the oversize top-level set tTkn1 with three sub-blocking tokens sTkn1'=sTkn2 sTkn3. With each node of the tree we can associate a block whose key is the list of blocks keys in that node and whose records are the intersection of the records in those blocks, e.g., the tTkn1∩sTkn1∩sTkn2 node represents all the records for organizations containing all these tokens. Because the cardinality of an intersected set is less than or equal to the cardinalities of the sets that were intersected, every block in the tree is larger than or equal to any of its children. We traverse the tree breadth-first and only recurse into nodes above the maximum block size. This allows us to explore the space of possible sub-blocks in cardinality order for a given branch, stopping as soon as we have a small enough sub-block.

Figure 4A:
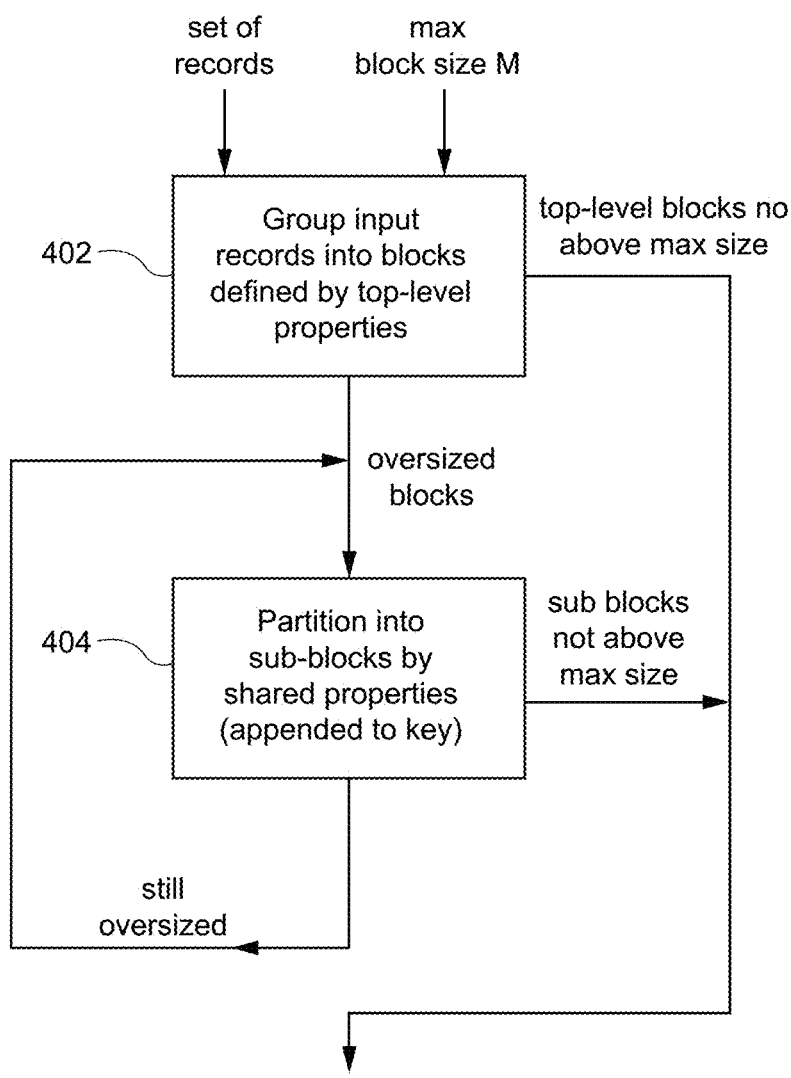
FIG. 4A shows an example iterative blocking process.
Figure 5:
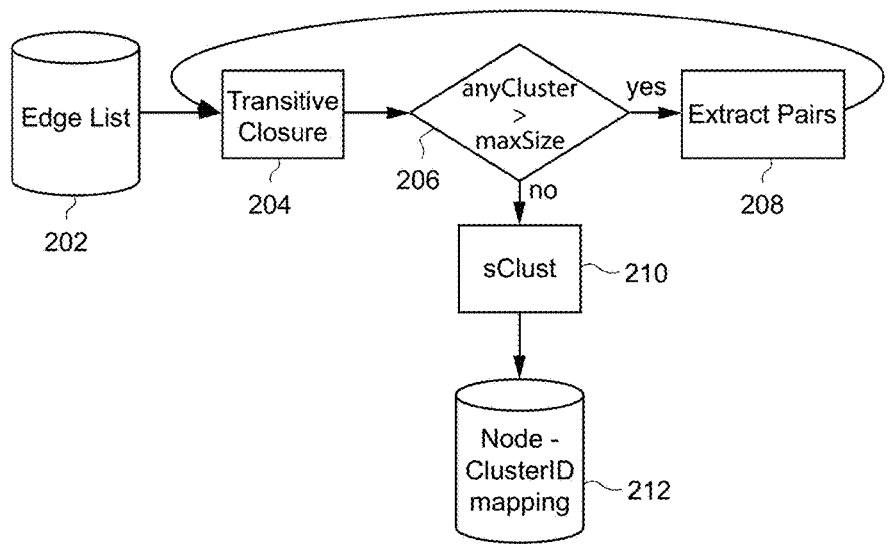
FIG. 5 shows an example clustering process.

The example non-limiting process shown in FIG. 4A creates the blocks and sub-blocks by taking as input a set of records and a maximum block size M. All the input records are grouped into blocks defined by the top-level properties (block 402). Those top-level blocks that are not above the maximum size are set aside. The remaining oversized blocks are partitioned into sub-blocks by sub-blocking properties that the records they contain share, and those properties are appended to the key (block 404). In the example embodiment, the process is continued recursively until all sub-blocks have been whittled down to an acceptable size.

Example non-limiting pseudo code of the blocking process is presented in FIG. 4B. We will represent the key and value pairs in the MapReduce framework as <key; value>. The input organization records are represented as <INPUT_FLAG, ORG_NAME>. For the first iteration, this job takes the organization list as input. In later iterations, the input is the output of the previous blocking iteration. In the first iteration, the mapper function extracts the top-level and sub-level tokens from the input records. It combines the organization name and all the sub-level tokens in a temp variable called newValue. Next, for each top-level token, it emits this top-level token and the newValue in the following format: <topToken,newValue>. For the later iterations, it combines each sub level token with the current blocking key, and emits them to the reducer. Also note that the lexicographic ordering of the block keys allows separate mapper processes to work on different nodes in a level of the binomial tree without creating redundant sub-blocks (e.g., if one mapper creates a International∩Business∩Machines block another mapper will not create a International∩Machines∩Business one). This is useful because to be most efficient, individual MapReduce jobs typically run independently without shared memory or other runtime communication mechanisms.

As described in FIG. 4B, in the reduce phase, all the records will be grouped together for each block key. The reducer function iterates over all the records in a newly-created sub-block, counting them to determine whether or not the block is small enough or needs to be further subdivided. The blocks that the reducer deems oversized become inputs to the next iteration. Care is taken that the memory requirements of the reducer function are constant in the size of a fixed buffer because otherwise the reducer runs out of memory on large blocks. Note that we create a black list from the high frequency words in organization names, and we don't use these as top-level properties as such words do not help us with individuating the records.

More formally, this process can be understood in terms of operations on sets. In a set of N records there are $$\frac{1}{2}N(N-1)$$

unique pairs, so an enumeration over all of them is $O(N^2)$. The process of blocking divides this original set into k blocks, each of which contains at most a fixed maximum of M records. The exhaustive comparison of pairs from these sets is $O(k)$, and the constant factors are tractable if we choose a small enough M. In the worst case, all the sub-blocks except the ones with the very longest keys are oversize. Then the sub-blocking process will explore the power-set of all possible blocking keys and thus have exponential runtime. However, as the blocking keys get longer, the sets they represent get smaller and eventually fall beneath the maximum size. In practice these two countervailing motions work to keep this strategy tractable.

Example Pairwise Linkage 20 Model

The example non-limiting implementation uses a feature-based classification approach to predict the likelihood of two organization names $<o_1,o_2>$ referring to the same organization entity. Specifically, the example non-limiting embodiment uses the conventional OpenNLP maximum entropy (maxent) package as a machine learning tool. We choose to work with maxent because the training is fast and it has a good support for classification. Regarding the features, we mainly have two types: surface string features and context features. Examples of surface string features are edit distance of the two names, whether one name is an abbreviation of the other name, and the longest common substring of the two names. Examples of context features are whether the two names share the same url and the number of times that the two names co-occur with each other in a single person record.

Example Clustering 30

In this section, we describe an example non-limiting clustering approach. We first clarify a set of terms/conditions that will help us describe the process:

Definition (Connected Component): Let $G=(V, E)$ be an undirected graph where V is the set of vertices and E is the set of edges. $C=(C_1, C_2, \ldots, C_n)$ is the set of disjoint connected components in this graph where $(C_1 \cup C_2 \cup \ldots \cup C_n)=V$ and $(C_1 \cap C_2 \cap \ldots \cap C_n)=0$. For each connected component $C_i \in C$, there exists a path in G between any two vertices $v_k$ and $v_l$ where $(v_k,v_l) \in C_i$. Additionally, for any distinct connected component $(C_i,C_j) \in C$, there is no path between any pair $v_k$ and $v_l$ where $v_k \in C_i$, $v_l \in C_j$. Moreover, the problem of finding all connected components in a graph is finding the C satisfying the above conditions.

Definition (Component ID): A component id is a unique identifier assigned to each connected component.

Definition (Max Component Size): This is the maximum allowed size for a connected component.

Definition (Cluster Set): A cluster set is a set of records that belong to the same real world entity.

Definition (Max Cluster Size): This is the maximum allowed size for a cluster.

Definition (Match Threshold): Match threshold is a score where pairs scoring above this score are said to represent the same entity.

Definition (No-Match Threshold): No-Match threshold is a score where pairs scoring below this score are said to represent different entities.

Definition (Conflict Set): Each record has a conflict set which is the set of records that shouldn't appear with this record in any of the clusters.

The naive approach to clustering for entity resolution is transitive closure by using only the pairs having scores above the match threshold. However, in practice we might see many examples of conflicting scores. For example, (a,b) and (b,c) pairs might have scores above match threshold while (a,c) pair has a score below no-match threshold. If we just use transitive closure, we will end up with a single cluster with these three records (a,b,c). Another weakness of the regular transitive closure is that it creates disjoint sets. However, organizations might share name, or abbreviation. So, we need a soft clustering approach where a record might be in different clusters.

On the other hand, a large volume of data benefits from highly scalable and efficient parallelized process. However, it can be hard to implement parallelized clustering approaches with high precision for large scale graphs due to high time and space complexities. So, one example embodiment provides a two-step approach in order to build both a parallel and an accurate clustering framework. The high-level architecture of our clustering framework is illustrated in FIG. 3. We first find the connected components in the graph with our MapReduce based transitive closure approach 204, then further, partition each connected component in parallel with our novel soft clustering process, sClust 210. This way, we first combine similar record pairs into connected components in an efficient and scalable manner, and then further partition each connected component into smaller clusters for better precision.

Note that there is an undesirable phenomenon, black hole entities, in transitive closure of the pairwise scores. A black hole entity begins to pull an inordinate amount of records from an increasing number of different true entities into it as it is formed. This is potentially dangerous, because it will then erroneously match on more and more records, escalating the problem. Thus, by the end of the transitive closure, one might end up with black hole entities with millions of records belonging to multiple different entities. In order to avoid this problem, we define a black hole threshold, and if we end up with a connected component above the size of the black hole threshold, we increment the match threshold by a delta and further partition this black hole with one more transitive closure job. We repeat this process until the sizes of all the connected components are below the black hole threshold, and then apply sClust 210 on each connected component. Hence at the end of the entire entity resolution process, the system has partitioned all the input records into cluster sets called profiles, where each profile corresponds to a single entity.

Transitive Closure 204

Figure 6:
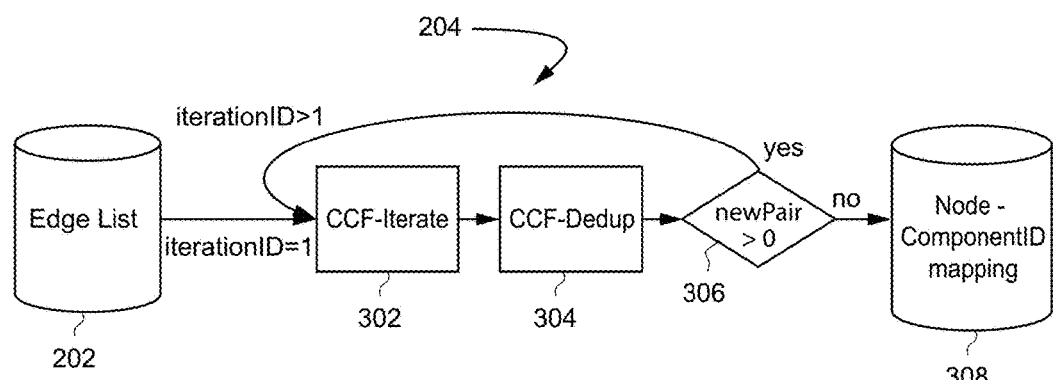
FIG. 6 shows an example transitive closure process.

In order to find the connected components in a graph, we developed the Transitive Closure (TC) module 204 shown in FIG. 6. The input 202 is the list of all pairs having scores above the match threshold. As an output from the module 308, what we want to obtain is the mapping from each node in the graph to its corresponding componentID. For simplicity, we use the smallest node id in each connected component as the identifier of that component. Thus, the module should output a mapping table from each node in the graph to the smallest node id in its corresponding connected component. To this end, we designed a chain of two MapReduce jobs, namely, TC-Iterate 302, and TC-Dedup 304, that will run iteratively until we find the corresponding componentIDs for all the nodes in the graph.

TC-Iterate job 302 generates adjacency lists AL=$(a_1, a_2, \ldots, a_n)$ for each node v, and if the node id of this node $v_{id}$ is larger than the min node id $a_{min}$ in the adjacency list, it first creates a pair $(v_{id}, a_{min})$ and then a pair for each $(a_i, a_{min})$ where $a_i \in AL$, and $a_i \neq a_{min}$. If there is only one node in AL, it means we will generate the pair that we have in previous iteration. However, if there is more than one node in AL, it means we might generate a pair that we didn't have in the previous iteration, and one more iteration is needed. Please note that, if $v_{id}$ is smaller than $a_{min}$, we don't emit any pair.

Example non-limiting pseudo code of TC-Iterate is given in FIG. 7. For the first iteration, this job takes the pairs having scores above the match threshold from the initial edge list as input. In later iterations, the input is the output of TC-Dedup from the previous iteration. We first start with the initial edge list to construct the first degree neighborhood of each node. To this end, for each edge <a;b>, the mapper emits both <a;b>, and <b;a> pairs so that a should be in the adjacency list of b and vice versa. In the reduce phase, all the adjacent nodes will be grouped together for each node. Reducers don't receive the values in a sorted order. So, we use a secondary sort approach to pass the values to the reducer in a sorted way with custom partitioning. This way, the first value becomes the minValue. If the minValue is larger than the key, we don't emit anything. Otherwise, we first emit the <key;minValue> pair. Next, we emit a pair for all other values as <value;minValue>, and increase the global NewPair counter by 1. If the counter is 0 at the end of the job, it means that we found all the components and there is no need for further iterations.

During the TC-Iterate job 302, the same pair might be emitted multiple times. The second job, TC-Dedup 304, just deduplicates the output of the CCF-Iterate job. This job increases the efficiency of TC-Iterate job 302 in terms of both speed and I/O overhead. Example non-limiting pseudo code for this job is given in FIG. 7.

The worst case scenario for the number of necessary iterations is d+1 where d is the diameter of the network. The worst case happens when the min node in the largest connected component is an end-point of the largest shortest-path. The best case scenario takes d/2+1 iterations. For the best case, the min node should be at the center of the largest shortest-path.

sClust: A Soft Agglomerative Clustering Approach 210

After partitioning the records into disjoint connected components, we further partition each connected component into smaller clusters with sClust approach 210. In the example non-limiting embodiment, sClust 210 is a soft agglomerative clustering approach. It is a hierarchical clustering method which uses the "conflict set" term that we described above. Any of the conflicting nodes cannot appear in a cluster with this approach. Additionally, the maximum size of the clusters can be controlled by an input parameter.

Figure 9A:
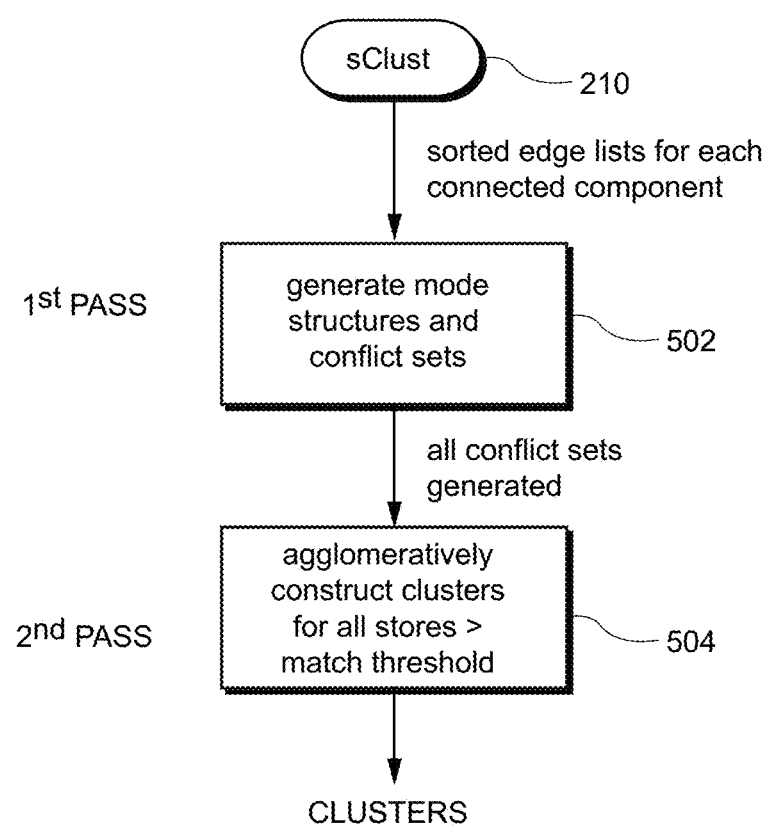
FIG. 9A shows example clustering processing that agglomerates to construct clusters.

First as a preprocessing step, we have a two-step MapReduce job (see FIG. 8) which puts together and sorts all the pairwise scores for each connected component discovered by transitive closure. Next, sClust job 210 takes the sorted edge lists for each connected component as input, and partitions each connected component in parallel. A flowchart of example steps performed by sClust 210 is shown in FIG. 9a, and example non-limiting pseudo-code for sClust job 210 is given in FIG. 9B. sClust 210 iterates over the pairwise scores twice. During the first iteration 502, it generates the node structures, and conflict sets for each of these structures. For example, if the pairwise score for (a, b) pair is below the no-match threshold, node a is added to node b's conflict set, and vice versa. By the end of the first iteration 502, all the conflict sets are generated. Now, one more pass 504 is needed to build the final clusters. Since the scores are sorted, we start from the highest score to agglomeratively construct the clusters by going over all the scores above the match threshold. Let's assume we have a pair (a, b) with a score above the match threshold. There might be 4 different conditions. First, both node a and node b are not in any of the clusters yet. In this case, we generate a cluster with these two records and the conflict set of this cluster becomes the union of conflict sets of these two records. Second, node a might already be assigned to a set of clusters C' while node b is not in any of the clusters. In these case, we add node b to each cluster in C' if it doesn't conflict with b. If there is no such cluster, we build a new cluster with nodes a and b. Third is the opposite version of the second condition, and the procedure is the same. Finally, both node a and node b might be in some set of clusters. If they already appear in the same cluster, no further action needed. If they just appear in different clusters, these clusters will be merged as long as there is no conflict between these clusters. If there are no such unconflicting clusters, we again build a new cluster with nodes a and b. This way, we go over all the scores above the match threshold and build the cluster sets. Note that if the clusters are merged, their conflict sets are also merged. Additionally, if the max cluster size parameter is defined, this condition is also checked before merging any two clusters, or adding a new node to an existing cluster.

EXAMPLES

We ran the experiments on a Hadoop cluster consisting of 50 nodes, each with 8 cores. There are 10 mappers, and 6 reducers available at each node. We also allocated 3 GB memory for each map/reduce task.

We used two different real-world datasets for our experiments. The first one is a list of 150K organizations along with their aliases. By using this dataset, we both trained our pairwise linkage model and measured the precision and recall of our system. We randomly selected 135K organizations from this list for the training. We used the rest of the organizations to measure the performance of our system. Next, we generated positive examples by exhaustively generating a pair between all the aliases. We also randomly generated equal number of negative examples among pairs of different organization alias sets. We trained our pairwise classifier with the training set, then ran it on the test set and measured its performance. Next, we extracted all the organization names from this set, and ran our entire entity resolution pipeline on top of this set. Table 1 presents the performance results. Our pairwise classifier has 97% precision and 63 transitive closure merges records transitively, it has very high recall but the precision is just 64%. Finally, we performed our sClust approach with the same match threshold. We set the no-match threshold to 0.3. The pairwise classifier has slightly better precision than sClust but sClust has much better recall. Overall, sClust has a much better f-measure than both the pairwise classifier and transitive closure.

TABLE 1

Performance Comparison

| | Precision | Recall | F-Measure |
|---|---|---|---|
| Pairwise Classifier | 97 | 63 | 76 |
| Transitive Closure | 64 | 98 | 77 |
| sClust | 95 | 76 | 84 |

Figure 10A:
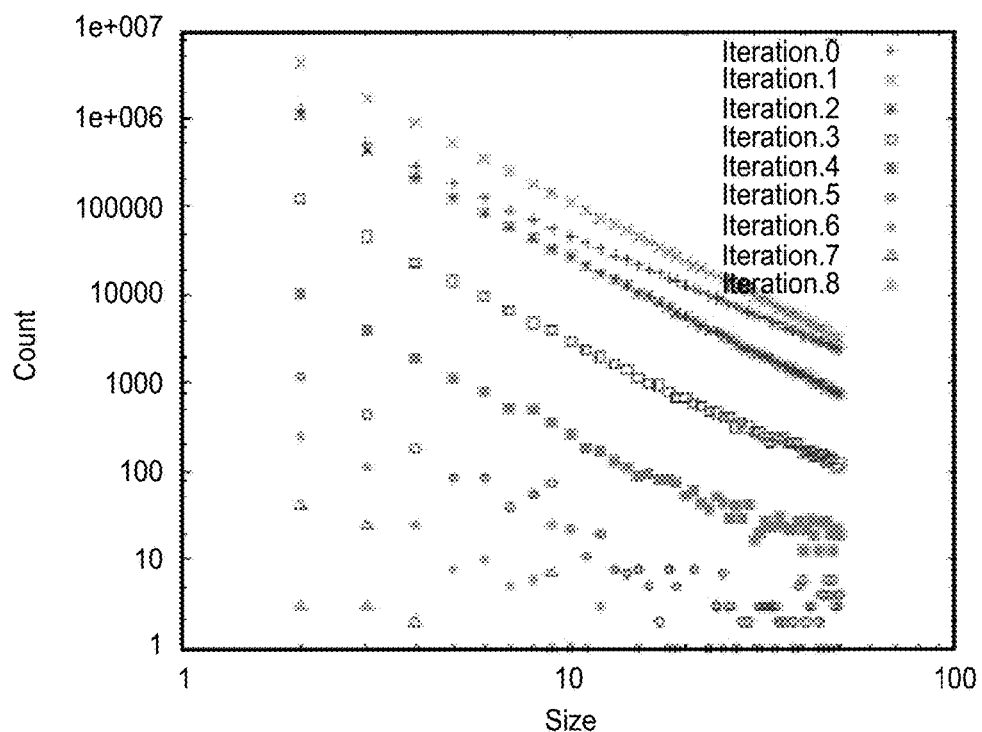
FIGS. 10A-10C show example test results.
Figure 10B:
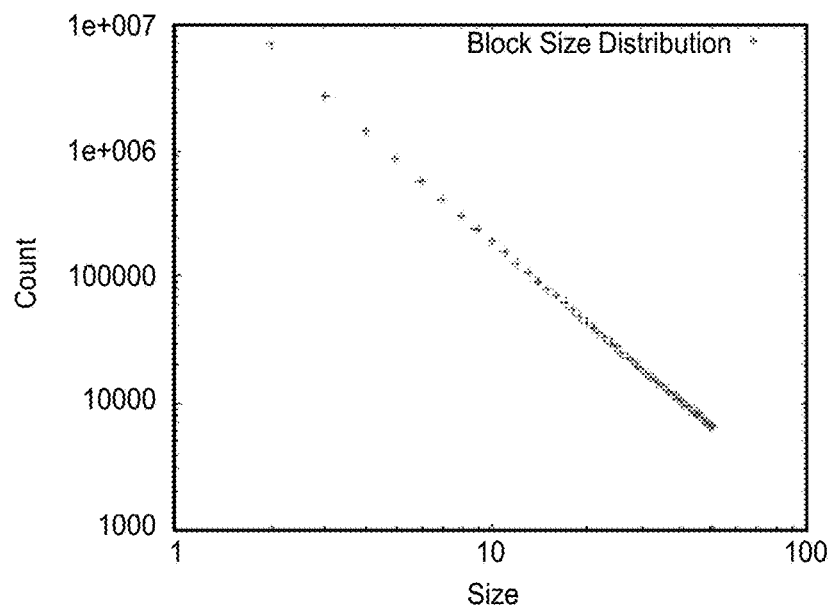
Figure 10C:
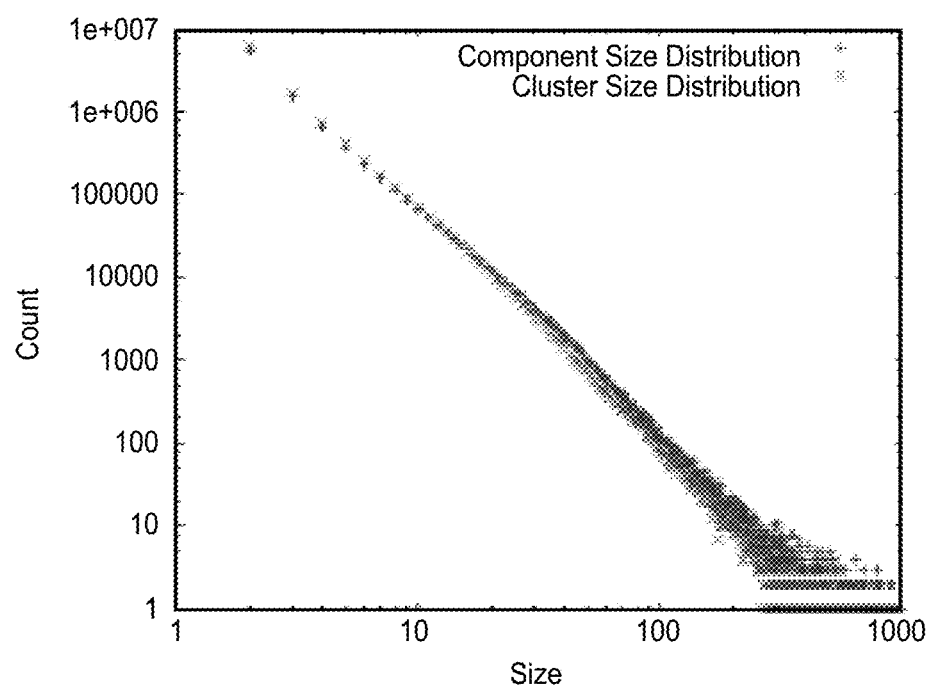

Second, we used our production set to show the viability of our framework. In this set, we have 68M organization names. We ran our framework on this dataset. Blocking generated 14M unique blocks, and there are 842M unique comparisons in these blocks. The distribution of the block sizes is presented in FIGS. 10-(a) and (b). Blocking finished in 42 minutes. Next, we ran our pairwise classifier on these 842M pairs and it finished in 220 minutes. Finally, we ended up with 10M clusters at the end of the clustering stage which took 3 hours. The distribution of the connected components and final clusters are presented in FIG. 10-(c).

Further Example: Extension Using Rich Business Entity Information

Figure 11:
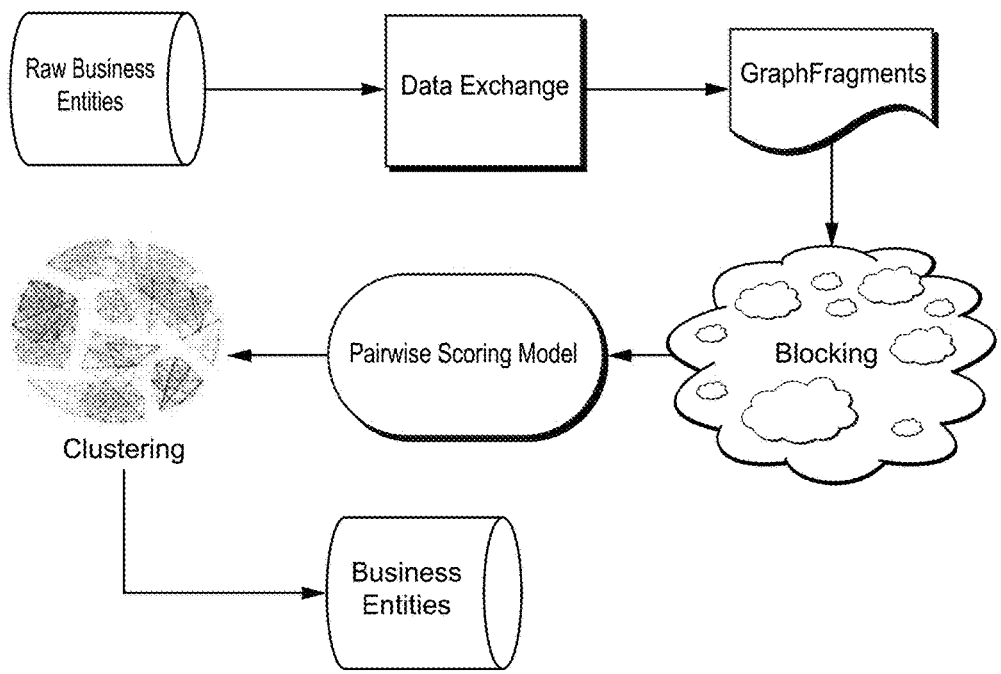
FIG. 11 shows an example non-limiting overall system.

In a further embodiment described in connection with FIGS. 11 & 12, a large scale business entity resolution system works on business entities with rich information (name, alias, address, phone number, url, industry, etc.). The business entities include companies and organizations. The system runs as a pipeline on distributed systems, such as Hadoop described above, and can deal with input business entities at the scale of tens of millions. A goal of the preferred embodiment system is to link the information about the same business entity together, so that the business entity can have more comprehensive information.

The system uses a machine learning based pairwise scoring model to decide whether two entities refer to the same real-world entity. In one example non-limiting arrangement, pairwise scoring model is a MaxEnt model described above, with more than sixty features to capture different types of information. The scoring model can achieve equivalent performance as pairwise scoring models which only deal with business entity names.

In this embodiment, an example training data set can be built iteratively with active learning. An example process is illustrated in FIG. 12. We first apply blocking to the input data set 1002 as discussed above to generate pairs of entities 1008 we would like to compare for scoring. Once we have obtained the blocks of entity pairs 1008, we iteratively build the training data set. For each iteration, we first use a pairwise model 1014 to score entity pairs. Using these scores, an example strategy is to sample entity pairs 1008, ensuring the training set is representative and effective. Initially, we use the pairwise scoring model 1014 discussed above which deals with the organization names to score, since we need training data to build the model and thus could not have a model before having the training data. Once we have sampled pairs 1008, internal data raters can annotate (1010) these pairs to indicate whether the two entities in a pair referred to the same entity. All the sample pairs 1008 are then double coded. When there is disagreement with annotations, a third person may annotate the pairs with disagreement, and the majority voted labels can be used as the final labels for these pairs.

After the newly sampled entity pairs are all annotated, we update the model (1012) by: 1) adding these entity pairs to the training set, and 2) developing new features to cover newly discovered cases during the annotation process. If necessary, the updated model can be used to sample entity pairs for the next iteration.

The business entities in our example non-limiting pipeline contain a subset of the following information:
Preferred name (every entity at least has this)
Alias
Address
Phone number
Homepage URL
Social network profile
Industry All of our features were based on these information. We developed over sixty features. Example features are be introduced in categories below.

4.1 Name-Based Features

The name-based features compare the preferred names of two business entities. When the business entities to compare were thin, the preferred names might be the only available information. The name-based features mainly include the features to extract: whether two preferred names matched exactly, the Levenshtein edit distance between two preferred names, the token-based Jaccard similarity, the character-based Jaccard similarity, the count of common tokens, the count of different tokens, whether two names were different domain names, whether a name was substring of the other name, and other features.

IsPersonName, checked whether the organization names to compare are persons' names. It is common to use person's names as organization names, e.g., a family business might just use the head of the household's name as the business name, the medical doctor might also just use the doctor's name as the business name. It is important to recognize if a business entity's name is a person's name. When the business entity's name was person's name, it was less likely two entities referred to the same entity, unless they are co-located. To leverage such pairs, we used a text classifier to determine whether a given string was a person's name.

IsFreebaseAlias, checked whether two preferred names shared a Freebase alias relation. Freebase is a large collaborative knowledge base created by real humans. It provides aliases for organizations using the "Also known as" property.

ShareLinkedInUrl, checks whether two preferred names share at least one same LinkedIn url. We have built a dictionary to map from the organization names to their linked urls from our people pipeline. Given two preferred names, we look up the dictionary to see if their mapped LinkedIn Urls had intersections.

4.2 Acronym-Based Features

Acronyms are commonly used in our daily life. For example, people often use "IBM" to refer to "International Business Machines". The formations of these two strings are totally different, while they refer the same business entity. So, acronyms are important to avoid organization name mismatch. We have designed several features to capture acronym match. Given a preferred name, we tokenized it to tokens, for each non-stopword tokens with upper case initials, we extracted the upper case initials as the acronym output, e.g. the acronym of "The University of Washington" is "UW", because "The" and "of" are standard stopwords.

The acronym-based features mainly included:

AcronymExactMatch, checked whether one name was a single token, and the other name's acronym matched it.

AcronymPartialMatch, checked whether one name was a single token, and the other name's acronym was a substring of that token.

AcronymIsToken, checked whether the acronym of a preferred name was a token of the other name, e.g., "IBM Corp." and "International Business Machines".

4.3 Location-Based Features

Location-based features can also be used to help distinguish entities. Unless a name is registered as a trademark, people are allowed to register their business with the same name in a different state. So, the locations can be used to distinguish businesses with the same or similar names but in different locations. Our location based features used the business addresses from vendors, and mainly included: exact address match with unit number, extract address match without unit number, street address match with different unit number, city state match, state match, zip code match, country mismatch, and other two features which were worth detailed description below.

OneSideIsPOBox: It is common to register a business with a Post Office mail box. It often happens that one data vendor gives a business's registered address, which might be a Post Office mail box, and another data vendor gives their office address. When two business entities shared the same name, same city and state, but one of the addresses is a Post Office box, it is more likely they refer to the same entity. Thus, recognizing whether an address is a Post Office mail box can be useful.

ShareMultipleOrganizationAddress: This checks when two organizations shared a same address, and whether that address is shared by multiple organizations. For multi-business buildings, such as the City Center Bellevue, there are multiple company tenants. When there was no other strong indictors, sharing a multiple tenant address does not mean two organizations refer to the same entity. To extract this feature, we build a business address frequency dictionary using the business records from one of our reliable data vendors.

4.4 URL-Based Features

URL-based features compare the homepage URL information. If two business entities share a same url, it is more likely they refer to the same entity. URL-based features mainly included homepage url match, homepage domain match, social profile url match.

4.5 Phone-Based Features

Phone-based features compare the phone information in an entity pairs. If two business entities share a same phone number, it is more likely they referred to the same entity. Phone-based features mainly included phone match, phone match count, whether two business entities shared a toll free phone number, and whether two business entities share a phone number which is shared by many other organizations.

4.6 Heuristic Features

The heuristic features can be used to ensure the special cases we discovered during the development of our pipeline system. These features mainly include:

OneSchoolOneSchoolDistrict, is used to differentiate a school district and a school. It is common to see very similar organization names in the same city and state, even share the same zip code, but one of them is a school, the other is a school district, such as "Beverly City Schools" and "Beverly City School" in New Jersey.

OneMdOneNot, is used to differentiate a medical doctor and a clinic. In our dataset, it is common to see that a business entity pair is a doctor and a clinic, when they share the same address and phone number, sometimes even urls. While we decided to separated them from business point of view, it is useful to capture them.

ChurchInDifferentAddress, is used to differentiate different churches which share the same name. From the url, we can see that there were 5115 churches named "First Baptist Church", but they are not the same church. We decided to separate the churches which do not share an address.

As discussed above, the pairwise score model can be implemented as a Maximum Entropy model, using the MaxEnt package from the OpenNLP project. We evaluate the model with ten-fold cross validation. We use the standard information retrieval metrics to measure the performance, including precision, recall and F-Measure.

Different from the standard classification model, the model we build is a scoring model. The difference is that we were not simply using the label which had the highest probability as the classification result. For each fold, we trained a model with the training dataset, and tested the model with testing dataset. During the testing phrase, we collected the labels with highest probabilities, and the probabilities (as the scores). After we have all the labels and scores for all the testing pairs, we rank them by their scores. Then we calculate the precision, recall and F-Measure by using each different score as the cutoff thresholds to determine the classification labels.

Table 2 below shows the performances using different score cutoffs which gave the precision of 0.99, 0.97, and 0.95.

TABLE 2

Pairwise Scoring Model Performance

| Score Cutoff | Precision | Recall | F-Measure |
|---|---|---|---|
| 0.861 | 0.991 | 0.509 | 0.672 |
| 0.721 | 0.971 | 0.606 | 0.742 |
| 0.651 | 0.952 | 0.635 | 0.762 |

Compared to the above embodiment, they reported the pairwise model's performance using the score cutoff of 0.65, which was same as the last row of Table 2. It is difficult to compare the performances directly, because the experiment dataset size were at different scales. Score-wise, the F-Measure were equivalent, and our recall was slightly higher (+0.05), and our precision was lower.

Figure 12:
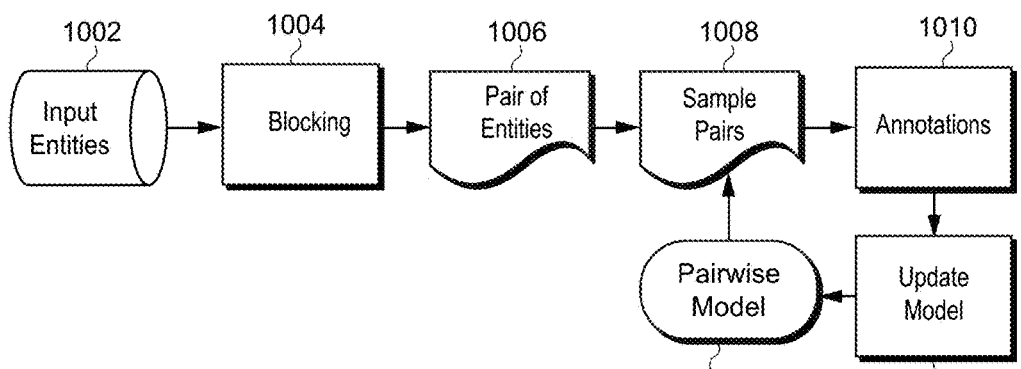
FIG. 12 shows an example training data set building process.

Additionally, using the scoring model trained with all the (e.g., 4,174) pairs of organizations in the organization pipeline of FIG. 12, we were able to conflate 16,561,835 input business entities into 6,393,615 final business entities profiles.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An agglomerative clustering system comprising:
a distributed memory arrangement that provides sorted edge lists for each connected component of a set of connected components; and
a distributed processing arrangement coupled to the distributed memory arrangement, the distributed processing arrangement including at least one processor being configured to generate conflict sets in a first pass, the conflict sets comprising sets of connected components that shouldn't appear together in any cluster as derived from the presence of a score that falls below a no-match threshold, and in a second pass to, in response to the generated conflict sets, agglomeratively construct clusters to partition the connected components in the conflict sets,
the distributed processing arrangement agglomeratively constructing clusters by:
setting a maximum allowed cluster size,
applying at least one matching threshold to conditionally add nodes to clusters up to the maximum allowed cluster size, and
upon the size of a cluster at least one of reaching and exceeding the maximum allowed cluster size, partitioning the cluster into smaller clusters.

2. The agglomerative clustering system of claim 1 wherein the distributed processing arrangement comprises a name node, a job submission node and plural of slave nodes.

3. The agglomerative clustering system of claim 2 wherein the plural slave nodes each include a processor that executes at least one mapper and at least one reducer.

4. The agglomerative clustering system of claim 3 wherein the plural slave nodes each include local memory coupled to the processor.

5. The agglomerative clustering system of claim 1 wherein the distributed processing arrangement is further configured to perform graph-based blocking.

6. The agglomerative clustering system of claim 1 wherein for each connected component $C_i \in C$, where C is the set of disjoint connected components in a graph, there exists a connection path between any two vertices $v_k$ and $v_l$ where $(v_k, v_l) \in C_i$.

7. The agglomerative clustering system of claim 6 wherein for any distinct connected component $(C_i, C_j) \in C$, where C is the set of disjoint connected components in a graph, there is no path between any pair $v_k$ and $v_l$ where $v_k \in C_i$, $v_l \in C_j$.

8. The agglomerative clustering system of claim 1 wherein the distributed processing arrangement is further configured to recursively partition oversized clusters into smaller clusters.

9. The agglomerative clustering system of claim 1 wherein the processor arrangement checks the maximum cluster size before merging two clusters or adding a new node to an existing cluster.

10. The agglomerative clustering system of claim 1 wherein upon the size of a cluster at least one of reaching and exceeding the maximum allowed cluster size, the processor arrangement increases the threshold and uses transitive closure to further partition the cluster.

11. The agglomerative clustering system of claim 10 wherein the processor iterates the step of claim 10 until the sizes of all connected components are below the maximum allowed cluster size.

12. The agglomerative clustering system of claim 1 wherein the processor continues to apply a match/no-match threshold to selectively add nodes to clusters up to the maximum allowed cluster size, and upon the size of a cluster at least one of reaching and exceeding the maximum allowed cluster size, partitioning the cluster into smaller clusters, until each cluster corresponds to a single entity.

13. An agglomerative clustering system comprising:
a memory that provides sorted edge lists for each connected component of a set of connected components; and at least one processor operatively coupled to the memory, the at least one processor being configured to generate conflict sets defining sets of connected components that shouldn't appear together in any cluster as derived from the presence of a score that falls below a no-match threshold and, in response to the generated conflict sets, agglomeratively construct clusters to partition the connected components in the conflict sets, the at least one processor agglomeratively constructing clusters by:

setting a maximum allowed cluster size;

score connected components;

compare the score to a match threshold above which the connected components are declared to represent the same entity;

compare the score to the no-match threshold below which the connected components are declared to represent different entities, the no-match threshold being different from the match threshold;

using the results of the comparisons, conditionally adding nodes to clusters up to the maximum allowed cluster size; and upon the size of a cluster at least one of reaching and exceeding the maximum allowed cluster size, partitioning the cluster into smaller clusters.

* * * * *